Patented Sept. 7, 1937

2,091,977

UNITED STATES PATENT OFFICE 2,091,977

PYROTECHNIC COMPOSITION FOR PRODUCING PINK SMOKE

George U. Graff, Washington, D. C.

No Drawing. Application September 16, 1935, Serial No. 40,796

6 Claims. (Cl. 52—24)

(Granted under the act of March 3, 1883, as amended April 30, 1928; 370 O. G. 757)

This invention relates to a pyrotechnic material for producing pink smoke and has for its object to provide a composition that will evolve an abundance of deeply colored smoke of the color specified.

This application is a continuation in part of my copending application Serial No. 652,428, filed 18 January, 1933.

A composition well adapted to produce pink smoke is calcium silicide 37 parts, potassium iodate 54 parts, and potassium chromate 9 parts. Another is calcium iodate 65 parts, potassium chromate 10 parts, and magnesium 25 parts. It will be noted from the above that the essential ingredients are, therefore, an iodate, a compound of calcium, an oxidizing agent, and a fuel which may or may not be in chemical combination with the calcium.

Experiments have shown that potassium bichromate is even more satisfactory than the potassium chromate. Other compounds suitable for use in the composition above set forth are potassium permanganate and potassium chlorate. Any calcium compound may be used to supply that element, as may any iodate to supply the iodine.

The substance specified gives off puffs of pink smoke that are particularly adapted for use in daylight fireworks and various daylight signaling devices, though the application of this invention is not limited to the purposes specified.

It is to be understood that the proportions specified for the several ingredients represent the preferred percentages for each combination but that strict adherence thereto is not essential as good results are obtained even when they are varied within considerable limits.

The herein described invention may be manufactured and used by or for the Government of the United States for governmental purposes without the payment of any royalty thereon.

I claim:

1. A pyrotechnic composition for producing pink smoke, comprising an iodate, a compound of calcium, an oxygen yielding compound of potassium chosen from the group potassium chromate, potassium bichromate, potassium permanganate, and potassium chlorate, and a fuel, the composition being operative both when the iodate and the calcium are present in the same compound and when they are in different compounds, only one source of iodate and one source of calcium being present in any chosen group of ingredients.

2. A pyrotechnic composition for producing pink smoke comprising a fuel chosen from the group calcium silicide and magnesium, an oxygen yielding salt of potassium chosen from the group potassium chromate, potassium bichromate, potassium permanganate, and potassium chlorate, and an iodate, the composition being operative both when the iodate and the calcium are present in the same compound and when they are in different compounds, only one source of iodate and one source of calcium being present in any chosen group of ingredients.

3. A pyrotechnic composition for producing pink smoke made up of three ingredients, comprising essentially a calcium compound, an iodate, an oxygen yielding salt of potassium chosen from the group potassium chromate, potassium bichromate, potassium permanganate, and potassium chlorate, and a fuel taken from the group calcium silicide and magnesium, any chosen group of ingredients including but one iodate and but one compound of calcium.

4. A pyrotechnic composition for producing pink smoke comprising essentially three ingredients consisting of an oxygen yielding salt selected from the group consisting of potassium chromate, potassium bichromate, potassium permanganate and potassium chlorate; a fuel selected from the class consisting of calcium silicide and magnesium; and an iodate selected from the group consisting of calcium iodate and potassium iodate, said composition containing not more than one calcium compound among the three ingredients or more than one fuel or one iodate.

5. A pyrotechnic composition for producing pink smoke, comprising calcium silicide, potassium iodate, and potassium chromate, substantially in the proportions 4:6:1.

6. A pyrotechnic composition for producing pink smoke, comprising calcium iodate, potassium chlorate, and magnesium, substantially in the proportions 13:2:5.

GEORGE U. GRAFF.